(12) United States Patent
Sobanski et al.

(10) Patent No.: US 12,668,354 B2
(45) Date of Patent: Jun. 30, 2026

(54) ADJUSTING PITCH FOR AIRFOILS OF AN AIRCRAFT PROPULSION SYSTEM

(71) Applicant: RTX Corporation, Farmington, CT (US)

(72) Inventors: Jon E. Sobanski, Glastonbury, CT (US); Jeffrey T. Morton, Manchester, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 12 days.

(21) Appl. No.: 18/824,558

(22) Filed: Sep. 4, 2024

(65) Prior Publication Data

US 2026/0062117 A1    Mar. 5, 2026

(51) Int. Cl.
| | |
|---|---|
| B64C 11/30 | (2006.01) |
| B64C 11/06 | (2006.01) |
| F01D 7/00 | (2006.01) |
| F01D 17/16 | (2006.01) |

(52) U.S. Cl.
CPC .............. B64C 11/30 (2013.01); B64C 11/06 (2013.01); F01D 7/00 (2013.01); F01D 17/162 (2013.01); F05D 2260/70 (2013.01)

(58) Field of Classification Search
CPC . B64C 11/30; B64C 11/06; F01D 7/00; F01D 17/162; F05D 2260/70
See application file for complete search history.

(56) References Cited

U.S. PATENT DOCUMENTS

| | | | |
|---|---|---|---|
| 4,738,589 | A | 4/1988 | Wright |
| 11,021,230 | B2 | 6/2021 | Binder |
| 11,391,298 | B2 | 7/2022 | Miller |
| 11,814,154 | B2 | 11/2023 | Freely |
| 2015/0225053 | A1 | 8/2015 | Perkinson |
| 2022/0063792 | A1 | 3/2022 | Freely |
| 2022/0371721 | A1 | 11/2022 | Boudebiza |
| 2024/0051656 | A1* | 2/2024 | Zutshi ..................... B64C 11/32 |
| 2024/0052753 | A1 | 2/2024 | Zutshi |
| 2024/0052755 | A1 | 2/2024 | Cafaro |
| 2025/0256857 | A1* | 8/2025 | Kupratis ................ B64D 27/14 |
| 2025/0376951 | A1* | 12/2025 | Iurlaro ................... F01D 13/00 |

OTHER PUBLICATIONS

EP Search Report for EP Patent Application No. 25200293.6 dated Feb. 4, 2026.

* cited by examiner

*Primary Examiner* — Andrew J Marien
(74) *Attorney, Agent, or Firm* — Getz Balich LLC

(57)    ABSTRACT

A method is provided for operating an aircraft propulsion system. During this method, rotation of a propulsor rotor of the propulsion system is driven about a rotational axis. The propulsor rotor includes a plurality of rotor blades. A first blade pitch schedule is applied to the propulsor rotor while the propulsor rotor is rotating about the rotational axis such that: (a) a pitch of each of the rotor blades has a maximum blade pitch value when located at a first circumferential position about the rotational axis; (b) the pitch of each of the rotor blades has a minimum blade pitch value when located at a second circumferential position about the rotational axis; and (c) a reference line extending between the first circumferential position and the second circumferential position is angularly offset from a pitch axis of the aircraft by a first offset angle between zero degrees and forty-five degrees.

17 Claims, 13 Drawing Sheets

ADJUSTING PITCH FOR AIRFOILS OF AN AIRCRAFT PROPULSION SYSTEM

BACKGROUND OF THE DISCLOSURE

1. Technical Field

This disclosure relates generally to an aircraft propulsion system and, more particularly, to adjusting pitch for airfoils of the aircraft propulsion system.

2. Background Information

Various types and configurations of aircraft propulsion systems are known in the art including those with an open propulsor rotor. Various types and configurations of blade pitch adjustment systems are also known in the art. While these known systems have various benefits, there is still room in the art for improvement.

SUMMARY OF THE DISCLOSURE

According to an aspect of the present disclosure, a method is provided for operating a propulsion system of an aircraft. During this method, rotation of a propulsor rotor of the propulsion system is driven about a rotational axis. The propulsor rotor includes a plurality of rotor blades arranged circumferentially around the rotational axis. A first blade pitch schedule is applied to the propulsor rotor while the propulsor rotor is rotating about the rotational axis such that: (a) a pitch of each of the rotor blades has a maximum blade pitch value when located at a first circumferential position about the rotational axis; (b) the pitch of each of the rotor blades has a minimum blade pitch value when located at a second circumferential position about the rotational axis; and (c) a reference line extending between the first circumferential position and the second circumferential position is angularly offset from a pitch axis of the aircraft by a first offset angle between zero degrees and forty-five degrees.

According to another aspect of the present disclosure, a system is provided for an aircraft. This aircraft system includes an airframe, a propulsion system and a controller. The airframe is configured as or otherwise includes a fuselage. The airframe has a roll axis, a pitch axis and a yaw axis. The propulsion system includes a propulsor rotor, a powerplant and an actuation system. The propulsor rotor includes a plurality of rotor blades arranged circumferentially around a rotational axis. The powerplant is coupled to and configured to drive rotation of the propulsor rotor about the rotational axis. The actuation system is operatively coupled to each of the rotor blades. The actuation system includes a swashplate and a plurality of actuators coupled to the swashplate. The controller is configured to operate the actuation system to apply a first blade pitch schedule to the propulsor rotor while the propulsor rotor is rotating about the rotational axis such that: (a) a pitch of each of the rotor blades has a maximum blade pitch value when located at a first circumferential position about the rotational axis; (b) the pitch of each of the rotor blades has a minimum blade pitch value when located at a second circumferential position about the rotational axis; and (c) a reference line extending between the first circumferential position and the second circumferential position is angularly offset from the pitch axis by an offset angle equal to or less than forty-five degrees when viewed in a reference plane perpendicular to the roll axis.

According to still another aspect of the present disclosure, a system is provided for an aircraft. This aircraft system includes a propulsor rotor, a stator vane structure, a powerplant and an actuation system. The propulsor rotor includes a plurality of rotor blades arranged circumferentially around a rotational axis. The stator vane structure is next to and downstream of the propulsor rotor. The stator vane structure includes a plurality of stator vanes arranged circumferentially around the rotational axis. The powerplant is configured to drive rotation of the propulsor rotor about the rotational axis. The actuation system includes an actuator. The actuation system is configured to asymmetrically change blade pitch of the rotor blades using the actuator as the propulsor rotor rotates about the rotational axis. The actuation system is also configured to asymmetrically change vane pitch of the stator vanes using the actuator concurrently with the asymmetric changing of the blade pitch of the rotor blades.

The assembly may also include an airframe and a controller. The airframe may have a roll axis, a pitch axis and a yaw axis. The controller may be configured to operate the actuation system to apply a first blade pitch schedule to the propulsor rotor while the propulsor rotor is rotating about the rotational axis such that: (a) a pitch of each of the rotor blades has a maximum blade pitch value when located at a first circumferential position about the rotational axis; (b) the pitch of each of the rotor blades has a minimum blade pitch value when located at a second circumferential position about the rotational axis; and (c) a reference line extending between the first circumferential position and the second circumferential position is angularly offset from the pitch axis by an offset angle equal to or less than forty-five degrees when viewed in a reference plane perpendicular to the roll axis.

The second circumferential position may be arranged diametrically opposite the first circumferential position.

The first offset angle may be equal to or greater than ten degrees.

The first offset angle may be equal to or less than twenty-five degrees.

The propulsion system may be disposed to a lateral side of a fuselage of the aircraft. The reference line may be pitched down towards a bottom side of the fuselage.

The propulsion system may be disposed to a lateral side of a fuselage of the aircraft. The reference line may be pitched up towards a top side of the fuselage.

The propulsion system may be disposed to a lateral side of a fuselage of the aircraft. The first circumferential position may be located closer to the fuselage than the second circumferential position.

The propulsion system may be disposed to a lateral side of a fuselage of the aircraft. The second circumferential position may be located closer to the fuselage than the first circumferential position.

The method may also include applying a second blade pitch schedule to the propulsor rotor while the propulsor rotor is rotating about the rotational axis such that: (a) the pitch of each of the rotor blades has a first blade pitch value when located at the first circumferential position about the rotational axis; (b) the pitch of each of the rotor blades has a second blade pitch value when located at the second circumferential position about the rotational axis; and (c) the second blade pitch value may be equal to the first blade pitch value.

The method may also include applying a second blade pitch schedule to the propulsor rotor while the propulsor rotor is rotating about the rotational axis such that the pitch of each of the rotor blades has a common blade pitch value independent of a circumferential position about the rotational axis.

The propulsion system may include a swashplate and a plurality of actuators coupled to the swashplate. The first blade pitch schedule may be applied to the propulsor rotor using the actuators through the swashplate.

The propulsion system may be an open rotor propulsion system. The propulsor rotor may be an open propulsor rotor.

The propulsion system may include a stator vane structure next to and downstream of the propulsor rotor. The stator vane structure may include a plurality of stator vanes arranged circumferentially around the rotational axis. The method may also include applying a first vane pitch schedule to the stator vane structure concurrently with the applying of the first blade pitch schedule to the propulsor rotor such that: (a) a pitch of one of the stator vanes located at a third circumferential position about the rotational axis has a maximum vane pitch value; (b) the pitch of another one of the stator vanes located at a fourth circumferential position about the rotational axis has a minimum vane pitch value; and (c) a second reference line extending between the third circumferential position and the fourth circumferential position may be angularly offset from the pitch axis of the aircraft by a second offset angle between zero degrees and forty-five degrees.

The second offset angle may be equal to or within five degrees of the first offset angle.

The propulsion system may include an actuator used to perform the applying of the first blade pitch schedule and the applying of the first vane pitch schedule.

A difference between the maximum blade pitch value and the minimum blade pitch value according to the first blade pitch schedule may be equal to a difference between the maximum vane pitch value and the minimum vane pitch value according to the first vane pitch schedule.

A difference between the maximum blade pitch value and the minimum blade pitch value according to the first blade pitch schedule may be greater than a difference between the maximum vane pitch value and the minimum vane pitch value according to the first vane pitch schedule.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
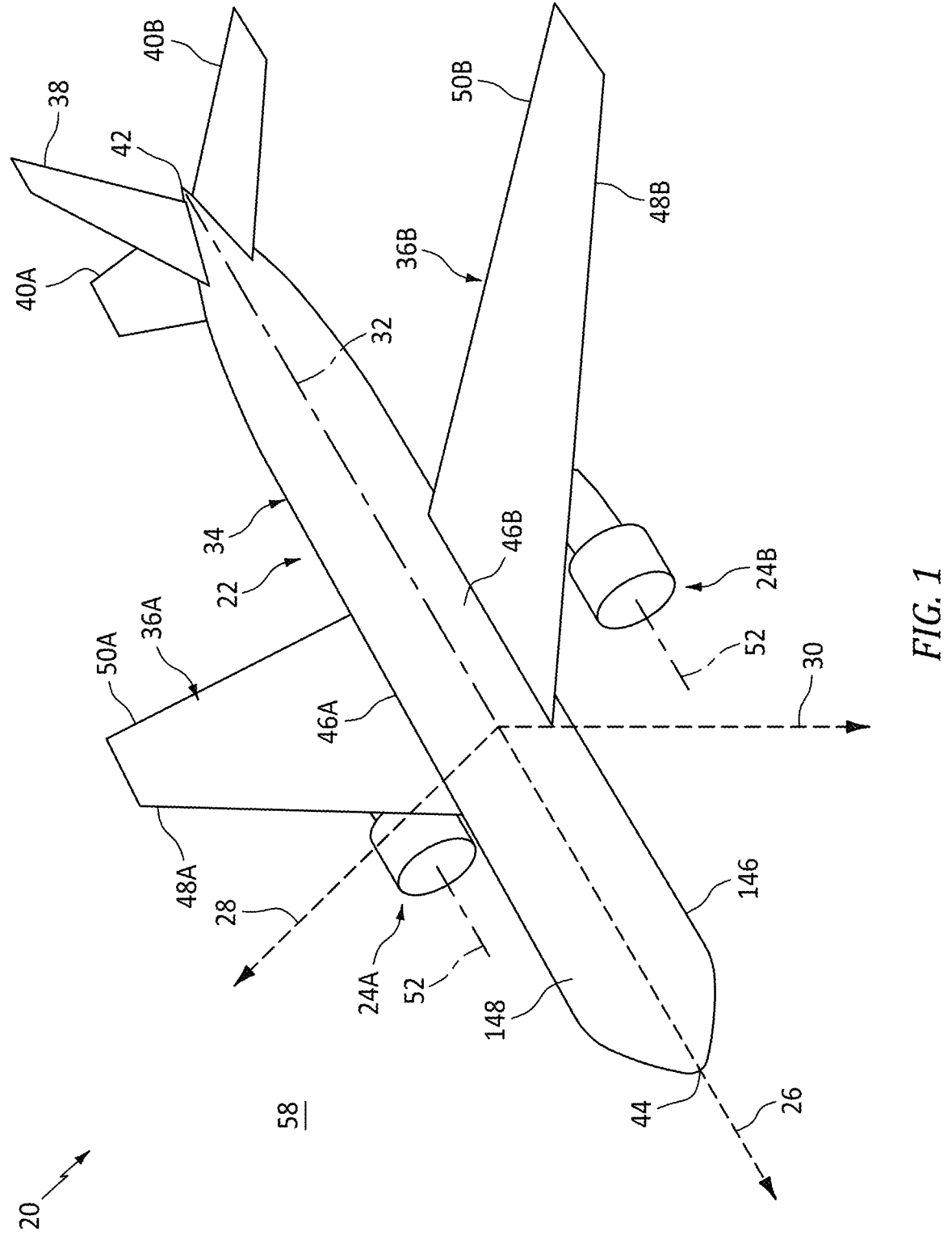
FIG. 1 is a perspective schematic illustration of an aircraft.

FIG. 1 is a perspective schematic illustration of an aircraft 20. This aircraft 20 may be an airplane, a drone (e.g., an unmanned aerial vehicle (UAV)), or any other manned or unmanned aerial vehicle or system. The aircraft 20 includes an aircraft airframe 22 and one or more aircraft propulsion systems 24A and 24B (generally referred to as "24"). The aircraft 20 and its aircraft airframe 22 have a roll axis 26, a pitch axis 28 and a yaw axis 30. The roll axis 26 and the pitch axis 28 of FIG. 1 lay in and define a common horizontal plane. The roll axis 26 of FIG. 1 is a longitudinally extending axis that may be parallel (e.g., coaxial) with, or slightly angularly offset (e.g., by less than 5° or) 10° vertically up or down from, a longitudinal centerline 32 of the aircraft 20 and its aircraft airframe 22. The pitch axis 28 of FIG. 1 is a laterally extending axis that is perpendicular to the roll axis 26. The yaw axis 30 of FIG. 1 is a vertically extending axis that is perpendicular to the roll axis 26 and the pitch axis 28 and, thus, perpendicular to the horizontal plane.

The aircraft airframe 22 of FIG. 1 includes an aircraft fuselage 34 and one or more aircraft wings 36A and 36B (generally referred to as "36"). This aircraft airframe 22 may also include one or more aircraft stabilizers, such as at least one vertical stabilizer 38 and one or more horizontal stabilizers 40A and 40B arranged at (e.g., on, adjacent or proximate) an aft, downstream tail end 42 of the aircraft fuselage 34. However, in other embodiments, it is contemplated one or more of the aircraft stabilizers 38, 40A and 40B may be omitted where, for example, the aircraft 20 is alternatively configured as a blended wing aircraft.

The aircraft fuselage 34 extends longitudinally along the longitudinal centerline 32 from a forward, upstream nose end 44 of the aircraft airframe 22 and its aircraft fuselage 34 to the fuselage tail end 42. The aircraft fuselage 34 extends laterally between and to opposing lateral sides 46A and 46B (generally referred to as "46") of the aircraft fuselage 34.

The aircraft wings 36A and 36B are arranged to the opposing lateral sides 46A and 46B of the aircraft fuselage 34. The first aircraft wing 36A of FIG. 1, for example, is connected to the aircraft fuselage 34 at the fuselage first side 46A. The second aircraft wing 36B is connected to the aircraft fuselage 34 at the fuselage second side 46B. The aircraft fuselage 34 of FIG. 1 is thereby located laterally between the first aircraft wing 36A and the second aircraft wing 36B. Each of these aircraft wings 36 projects spanwise out from the aircraft fuselage 34 to a tip of the respective aircraft wing 36. Each of the aircraft wings 36A, 36B extends longitudinally between and to a leading edge 48A, 48B of the respective aircraft wing 36A, 36B and a trailing edge 50A, 50B of the respective aircraft wing 36A, 36B.

The aircraft propulsion systems 24A and 24B of FIG. 1 are arranged to the opposing lateral sides 46A and 46B of the aircraft fuselage 34. The first aircraft propulsion system 24A of FIG. 1, for example, is mounted to the first aircraft wing 36A. The second aircraft propulsion system 24B is mounted to the second aircraft wing 36B. The aircraft fuselage 34 of FIG. 1 is thereby located laterally between the first aircraft propulsion system 24A and the second aircraft propulsion system 24B. The present disclosure, however, is not limited to such an exemplary arrangement.

Figure 2:
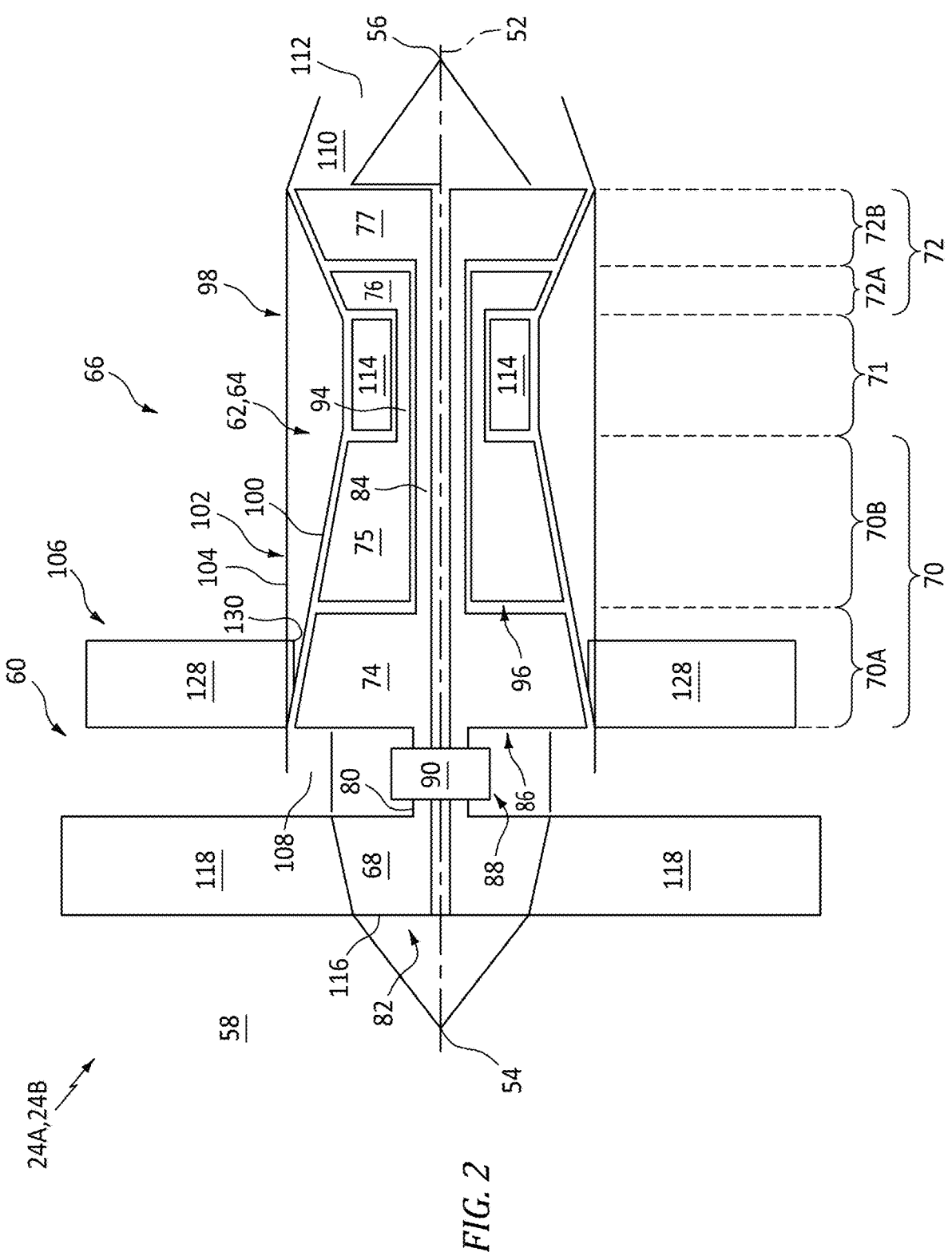
FIG. 2 is a schematic sectional illustration of a propulsion system for the aircraft.

Referring to FIG. 2, each aircraft propulsion system 24 extends axially along an axis 52 between a forward, upstream end 54 of the respective aircraft propulsion system 24 and an aft, downstream end 56 of the respective aircraft propulsion system 24. The propulsion system axis 52 may be a centerline axis of the respective aircraft propulsion system 24 and/or one or more of its members. The propulsion system axis 52 may also or alternatively be a rotational axis of one or more members of the respective aircraft propulsion system 24. Referring to FIG. 1, the propulsion system axis 52 may also be parallel with, or slightly angularly offset (e.g., by less than 5° or) 10° vertically up or down from, the longitudinal centerline 32 and/or the roll axis 26 when viewed, for example, in the horizontal plane and/or a longitudinal reference plane parallel to (e.g., defined by) the roll axis 26 and the yaw axis 30.

The aircraft propulsion system 24 of FIG. 2 is configured as an open rotor propulsion system; e.g., a single rotor and swirl recovery vane (SRV) open rotor propulsion system. Here, the term "open" may describe a propulsion system section and/or a propulsion system component which is open to an environment 58 (e.g., an ambient environment) external to the respective aircraft propulsion system 24 and, more generally, the aircraft 20 (see FIG. 1). The aircraft propulsion system 24 of FIG. 2, for example, includes an open rotor propulsion section 60 and a powerplant 62 configured to power operation of the propulsion section 60. For case of description, the powerplant 62 is described below as a core 64 (e.g., a gas generator) of a turbine engine 66, where the engine core 64 is configured to drive rotation of a bladed propulsor rotor 68 about the propulsion system axis 52. The engine core 64 includes a compressor section 70, a combustor section 71 and a turbine section 72. The compressor section 70 of FIG. 2 includes a low pressure compressor (LPC) section 70A and a high pressure compressor (HPC) section 70B. The turbine section 72 of FIG. 2 includes a high pressure turbine (HPT) section 72A and a low pressure turbine (LPT) section 72B. The present disclosure, however, is not limited to turbine engine aircraft propulsion systems 24. The engine core 64, for example, may alternatively have a reverse core configuration where a direction of gas flow through the engine core 64 is opposite to a direction of propulsion system forward thrust. The powerplant 62, for example, may alternatively be configured as or otherwise include a rotary internal combustion (IC) engine, a hybrid-electric engine, an electric motor or another drive unit which is operable to drive the rotation of the propulsor rotor 68 about the propulsion system axis 52. Moreover, while the aircraft propulsion system 24 of FIG. 2 is shown with a tractor configuration, it is contemplated the aircraft propulsion system 24 may alternatively have a pusher configuration where the propulsion section 60 is at (or about) the propulsion system downstream end 56.

The propulsion section 60 of FIG. 2 includes the propulsor rotor 68. This propulsor rotor 68 is configured as an open rotor (e.g., an un-ducted rotor) which projects radially into and is exposed to the external environment 58. The LPC section 70A includes a bladed low pressure compressor (LPC) rotor 74. The HPC section 70B includes a high pressure compressor (HPC) rotor 75. The HPT section 72A includes a bladed high pressure turbine (HPT) rotor 76. The LPT section 72B includes a bladed low pressure turbine (LPT) rotor 77. Each of the bladed rotors 74-77 of FIG. 2 is configured as a bladed ducted rotor internal within the respective aircraft propulsion system 24 and outside of the external environment 58.

The propulsor rotor 68 of FIG. 2 is connected to a propulsor shaft 80. At least (or only) the propulsor rotor 68 and the propulsor shaft 80 collectively form a propulsor rotating structure 82. This propulsor rotating structure 82 of FIG. 2 and its members 68 and 80 are rotatable about the propulsion system axis 52 of the respective aircraft propulsion system 24.

The LPC rotor 74 is coupled to and rotatable with the LPT rotor 77. The LPC rotor 74 of FIG. 2, for example, is connected to the LPT rotor 77 through a low speed shaft 84. At least (or only) the LPC rotor 74, the LPT rotor 77 and the low speed shaft 84 collectively form a low speed rotating structure 86; e.g., a low speed spool of the engine core 64. This low speed rotating structure 86 of FIG. 2 and its members 74, 77 and 84 are rotatable about the propulsion system axis 52 of the respective aircraft propulsion system 24. However, the low speed rotating structure 86 and its members 74, 77 and 84 may alternatively be rotatable about another axis which is laterally (e.g., vertically and/or horizontally) offset and/or angularly offset from the rotational axis 52 of the propulsor rotor 68. Moreover, it is contemplated the low speed rotating structure 86 may alternatively be configured without the LPC rotor 74 such that the LPT rotor 77 is configured as a free turbine rotor/a power turbine (PT) rotor for the propulsor rotor 68.

The low speed rotating structure 86 is also coupled to the propulsor rotating structure 82 through a drivetrain 88. This drivetrain 88 may be configured as a geared drivetrain, where a geartrain 90 (e.g., a transmission, a speed change device, an epicyclic geartrain, etc.) is disposed between and operatively couples the propulsor rotor 68 to the low speed rotating structure 86 and its LPT rotor 77. With this arrangement, the propulsor rotor 68 may rotate at a different (e.g., slower) rotational speed than the low speed rotating structure 86 and its LPT rotor 77. Here, the propulsor rotor 68 and the low speed rotating structure 86 may rotate in a common (the same) direction about the propulsion system axis 52 or in opposite directions about the propulsion system axis 52 depending, for example, upon the specific configuration of the geartrain 90. Alternatively, the drivetrain 88 may be configured as a direct drive drivetrain, where the geartrain 90 is omitted. With such an arrangement, the propulsor rotor 68 rotates at a common (the same) rotational speed as the low speed rotating structure 86 and its LPT rotor 77.

The HPC rotor 75 is coupled to and rotatable with the HPT rotor 76. The HPC rotor 75 of FIG. 2, for example, is connected to the HPT rotor 76 through a high speed shaft 94. At least (or only) the HPC rotor 75, the HPT rotor 76 and the high speed shaft 94 collectively form a high speed rotating structure 96; e.g., a high speed spool of the engine core 64. This high speed rotating structure 96 of FIG. 2 and its members 75, 76 and 94 are rotatable about the propulsion system axis 52 of the respective aircraft propulsion system 24.

The engine sections 70A-72B may be arranged sequentially along the propulsion system axis 52 of the respective aircraft propulsion system 24 and are housed within a stationary housing 98 of the respective aircraft propulsion system 24. This propulsion system housing 98 includes a core case 100 (e.g., a gas generator case) and a nacelle 102. The core case 100 houses one or more of the engine sections 70A-72B; e.g., the engine core 64. The core case 100 of FIG. 2, for example, extends axially along (e.g., axially overlaps) and extends circumferentially about (e.g., circumscribes) the engine sections 70A-72B and their respective bladed rotors 74-77. The core case 100 may also house the geartrain 90. The nacelle 102 houses and provides an aerodynamic cover over the core case 100. An exterior wall 104 of the nacelle 102 of FIG. 2, for example, is disposed radially outboard of, extends axially along (e.g., axially overlaps) and extends circumferentially about (e.g., circumscribes) the engine core 64 and its core case 100. With this arrangement, the bladed rotors 74-77 are disposed within the propulsion system housing 98. The propulsor rotor 68 is disposed at least partially (or completely) outside of the propulsion system housing 98.

During operation of the respective aircraft propulsion system 24, ambient air within the external environment 58 is propelled by the propulsor rotor 68 in an aft, downstream direction towards the propulsion system downstream end 56. A major portion (e.g., more than 50%) of this air bypasses the engine core 64 to provide forward thrust while a minor portion (e.g., less than 50%) of the air flows into the engine core 64. An outer stream of the air propelled by the propulsor rotor 68, for example, flows axially across a guide vane structure 106 (e.g., a stator vane structure) of the propulsion section 60 and outside of the propulsion system housing 98 (along the nacelle wall 104). The guide vane structure 106 is configured to condition (e.g., straighten out) the air propelled by the propulsor rotor 68, for example, to remove or reduce circumferential swirl and thereby enhance the forward thrust. An inner stream of the air propelled by the propulsor rotor 68 flows through an airflow inlet 108 of a core flowpath 110 into the aircraft propulsion system 24 and its engine core 64. The core flowpath 110 extends sequentially through the LPC section 70A, the HPC section 70B, the combustor section 71, the HPT section 72A and the LPT section 72B from the core inlet 108 to a combustion products exhaust 112 from the core flowpath 110 into the external environment 58. The air entering the core flowpath 110 may be referred to as "core air".

The core air is compressed by the LPC rotor 74 and the HPC rotor 75 and directed into a combustion chamber 114 (e.g., an annular combustion chamber) of a combustor (e.g., an annular combustor) in the combustor section 71. Fuel is injected into the combustion chamber 114 by one or more fuel injectors and mixed with the compressed core air to provide a fuel-air mixture. This fuel-air mixture is ignited and combustion products thereof flow through and sequentially drive rotation of the HPT rotor 76 and the LPT rotor 77. The rotation of the HPT rotor 76 and the LPT rotor 77 respectively drive rotation of the HPC rotor 75 and the LPC rotor 74 and, thus, compression of the air received from the core inlet 108. The rotation of the LPT rotor 77 also drives rotation of the propulsor rotor 68 through the drivetrain 88 and its geartrain 90 of FIG. 2. The rotation of the propulsor rotor 68, in turn, propels the ambient air within the external environment 58 in the aft, downstream direction. With this arrangement, the engine core 64 powers operation of (e.g., drives rotation of) the propulsor rotor 68 during aircraft propulsion system operation.

The propulsor rotor 68 of FIG. 2 includes a propulsor rotor base 116 (e.g., a disk or a hub) and a plurality of open propulsor blades 118 (e.g., airfoils). The propulsor blades 118 are arranged circumferentially about the rotor base 116 and the propulsion system axis 52 of the respective aircraft propulsion system 24 in an array; e.g., a circular array. Each of the propulsor blades 118 is connected to (e.g., formed integral with or otherwise attached to) the rotor base 116.

Figure 3:
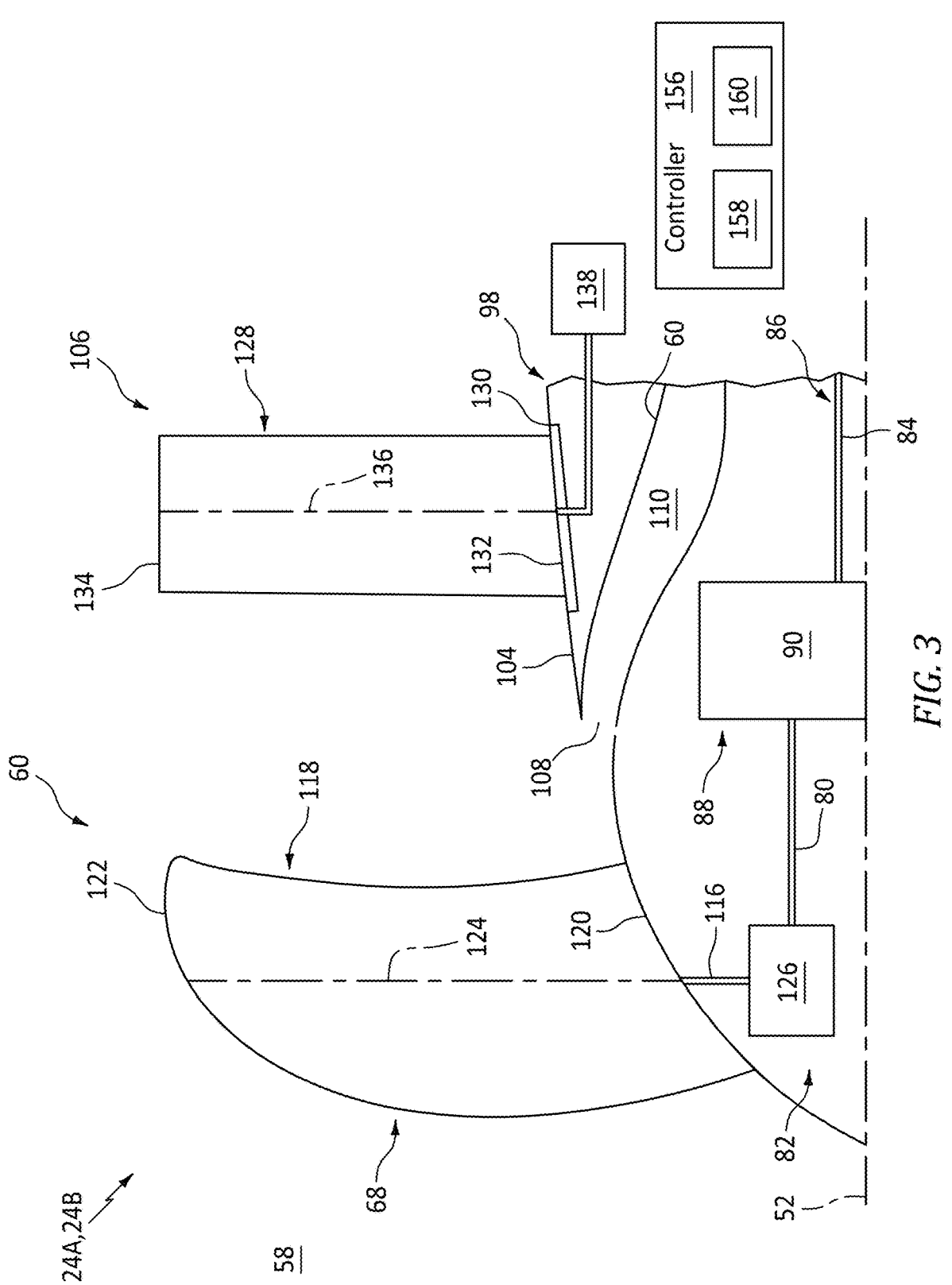
FIG. 3 is a partial schematic sectional illustration of the propulsion system at an open propulsor rotor and an open guide vane structure.

Referring to FIG. 3, each of the propulsor blades 118 projects spanwise along a span line of the respective propulsor blade 118 (e.g., radially relative to the respective propulsion system axis 52) out from an exterior surface 120 of the rotor base 116, into the external environment 58, to an unshrouded, distal tip 122 of the respective propulsor blade 118. Each propulsor blade 118 is thereby configured as an un-ducted and unshrouded propulsor blade which is exposed to (e.g., disposed in) the surrounding external environment 58.

Each propulsor blade 118 may be configured to pivot about a respective pivot axis 124. This blade pivot axis 124 extends radially relative to the propulsion system axis 52 of the respective aircraft propulsion system 24. The blade pivot axis 124 of FIG. 3, for example, is arranged perpendicular to the respective propulsion system axis 52 when viewed, for example, in the longitudinal reference plane; e.g., plane of FIG. 3. Each propulsor blade 118 of FIG. 3 is operatively coupled with a blade actuation system 126. This blade actuation system 126 is configured to pivot each propulsor blade 118 about its respective blade pivot axis 124 as described below in further detail. By pivoting the respective propulsor blade 118 about the respective blade pivot axis 124, a pitch of the respective propulsor blade 118 may be changed. Note, while the blade pivot axis 124 is shown as being perpendicular to the respective propulsion system axis 52 in FIG. 3, it is contemplated this blade pivot axis 124 may or may not be coincident with the respective propulsion system axis 52. Moreover, it is contemplated each blade pivot axis 124 may alternatively be angularly offset from the respective propulsion system axis 52 by an acute angle or an obtuse angle when viewed, for example, in the longitudinal reference plane. Of course, in other embodiments, it is contemplated some or all of the propulsor blades 118 may be alternatively moved to change the propulsor blade pitch.

The guide vane structure 106 of FIG. 2 includes a plurality of open exit guide vanes 128 (e.g., airfoils) arranged circumferentially about the propulsion system axis 52 of the respective aircraft propulsion system 24 in an array; e.g., a circular array. This guide vane structure 106 and its guide vanes 128 are arranged axially next to (e.g., adjacent) the propulsor rotor 68 and its propulsor blades 118. The guide vane structure 106 and its guide vanes 128 of FIG. 2, for example, are arranged downstream of the propulsor rotor 68 and its propulsor blades 118, without (e.g., any) other elements axially therebetween to obstruct, turn and/or otherwise influence the air propelled by the propulsor rotor 68 to the guide vane structure 106 for example. Each of the guide vanes 128 of FIG. 2 is coupled to a support structure 130 of the propulsion system housing 98. This support structure 130 may be a support frame, a case or another fixed structure of the propulsion system housing 98.

Referring to FIG. 3, each of the guide vanes 128 projects spanwise along a span line of the respective guide vane 128 (e.g., radially relative to the respective propulsion system axis 52) out from an exterior surface 132 of the propulsion system housing 98, into the external environment 58, to an unshrouded, distal tip 134 of the respective guide vane 128. Each guide vane 128 is thereby configured as an un-ducted and unshrouded guide vane which is exposed to (e.g., disposed in) the surrounding external environment 58.

Each guide vane 128 may be configured to pivot about a respective pivot axis 136. This vane pivot axis 136 extends radially relative to the propulsion system axis 52 of the respective aircraft propulsion system 24. The vane pivot axis 136 of FIG. 3, for example, is arranged perpendicular to the respective propulsion system axis 52 when viewed, for example, in the longitudinal reference plane. Each guide vane 128 of FIG. 3 is operatively coupled with a vane actuation system 138, which vane actuation system 138 may be discrete from or integrated as part of the blade actuation system 126. The vane actuation system 138 is configured to pivot each guide vane 128 about its respective vane pivot axis 136. By pivoting the respective guide vane 128 about the respective vane pivot axis 136, a pitch of the respective guide vane 128 may be changed. Note, while the vane pivot axis 136 is shown as being perpendicular to the respective propulsion system axis 52 in FIG. 3, it is contemplated this vane pivot axis 136 may or may not be coincident with the respective propulsion system axis 52. Moreover, it is contemplated each vane pivot axis 136 may alternatively be angularly offset from the respective propulsion system axis 52 by an acute angle or an obtuse angle when viewed, for example, in the longitudinal reference plane. Of course, in other embodiments, it is contemplated some or all of the guide vanes 128 may be alternatively moved to change the guide vane pitch. In still other embodiments, it is contemplated some or all of the guide vanes 128 may alternatively be configured as fixed (e.g., non-moving) guide vanes.

During aircraft flight, the propulsor rotor 68 of each aircraft propulsion system 24 is subject to various loads. For example, when the aircraft 20 is pitched upwards and climbing, each propulsor rotor 68 may be subject to IP loading. The term "IP loading" may describe a (e.g., relatively) large in-plane cyclic aerodynamic loading of an open propulsor rotor when: (a) an inflow of air to the open propulsor rotor is not uniform and/or (b) a trajectory of the air inflow is not aligned with a rotating axis of the open propulsor rotor. To reduce effects of such 1P loading and/or other propulsor rotor loading, a tailored blade pitch schedule may be applied to the propulsor rotor 68 while the propulsor rotor 68 is rotating about its propulsion system axis 52 using the blade actuation system 126; e.g., see FIG. 4. Similarly, a tailored vane pitch schedule may also (or alternatively) be applied to the guide vane structure 106 using the vane actuation system 138; e.g., see FIG. 7.

Figure 4:
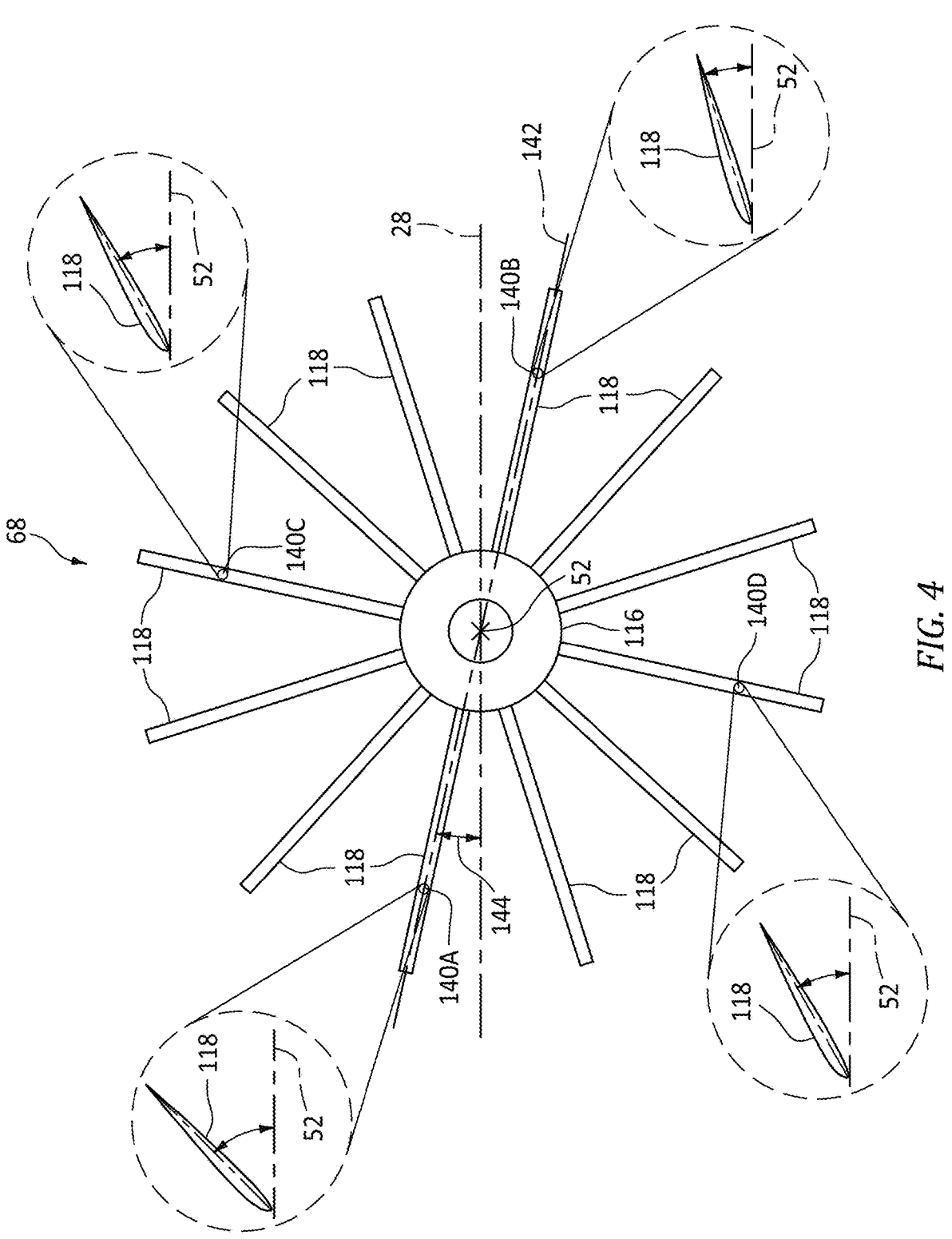
FIG. 4 is a schematic illustration of an asymmetric blade pitch schedule applied to the open propulsor rotor.

FIG. 4 schematically illustrates an exemplary tailored blade pitch schedule applied to the propulsor rotor 68, where inset views are sectional views looking radially inward in a tip-to-base direction where the propulsion system axis 52 is horizontal with the leading edge on a lefthand side. This blade pitch schedule of FIG. 4 is an asymmetric blade pitch schedule. For example, the blade pitch schedule of FIG. 4 is applied by the blade actuation system 126 (see FIG. 3) such that: (a) the propulsor blade pitch of each propulsor blade 118 has a maximum blade pitch value when the respective propulsor blade 118 is located at (e.g., passes across) a first circumferential position 140A about the propulsion system axis 52; and (b) the propulsor blade pitch of each propulsor blade 118 has a minimum blade pitch value when the respective propulsor blade 118 is located at a second circumferential position 140B about the propulsion system axis 52. The first circumferential position 140A of FIG. 4 is located diametrically opposite the second circumferential position 140B. A (e.g., straight) blade pitch max-to-min reference line 142 extending from the first circumferential position 140A to the second circumferential position 140B is thereby coincident with the propulsion system axis 52. With this blade pitch schedule of FIG. 4, the blade actuation system 126 (see FIG. 3) continuously pivots each respective propulsor blade 118 about its blade pivot axis 124 (see FIG. 3) such that: (a) the propulsor blade pitch of the respective propulsor blade 118 (e.g., uniformly or non-uniformly) increases from the minimum blade pitch value to the maximum blade pitch value as the respective propulsor blade 118 rotates circumferentially about the propulsion system axis 52 from the second circumferential position 140B through an intermediate position 140D to the first circumferential position 140A; and then (b) the propulsor blade pitch of the respective propulsor blade 118 (e.g., uniformly) decreases from the maximum blade pitch value to the minimum blade pitch value as the respective propulsor blade 118 rotates circumferentially about the propulsion system axis 52 from the first circumferential position 140A through an intermediate position 140C to the second circumferential position 140B. Thus, when each propulsor blade 118 is located at each intermediate circumferential position 140C, 140D about the propulsion system axis 52 (e.g., midway) between the first circumferential position 140A and the second circumferential position 140B, the propulsor blade pitch of that respective propulsor blade 118 has a value between (e.g., half of a difference between) the maximum blade pitch value and the minimum blade pitch value.

To reduce the effects of 1P loading, the blade pitch schedule of FIG. 4 is tailored such that the blade pitch max-to-min reference line 142 is angularly offset from the pitch axis 28 by an offset angle 144 when viewed, for example, in a lateral reference plane parallel to (e.g., defined by) the pitch axis 28 and the yaw axis 30 (see FIG. 1). This blade pitch max-to-min reference line offset angle 144 may be between zero degrees) (0° and forty-five degrees) (45° inclusive. Within the foregoing range, the blade pitch max-to-min reference line offset angle 144 may be equal to or greater than ten degrees) (10° and/or equal to or less than twenty-five degrees) (25°. For example, the blade pitch max-to-min reference line offset angle 144 may be between fifteen degrees) (15° and twenty degrees) (20° inclusive in some select embodiments. The present disclosure, however, is not limited to such an exemplary blade pitch schedule. For example, it is contemplated the blade pitch schedule of FIG. 4 may be rotated (e.g., +/−30°, +/−45°, +/−60°, +/−90° or anywhere in-between) about the respective propulsion system axis 52 to reduce effects of other types of loading and/or to provide thrust vectoring from the propulsor rotor 68.

Figures 5A, 5B:
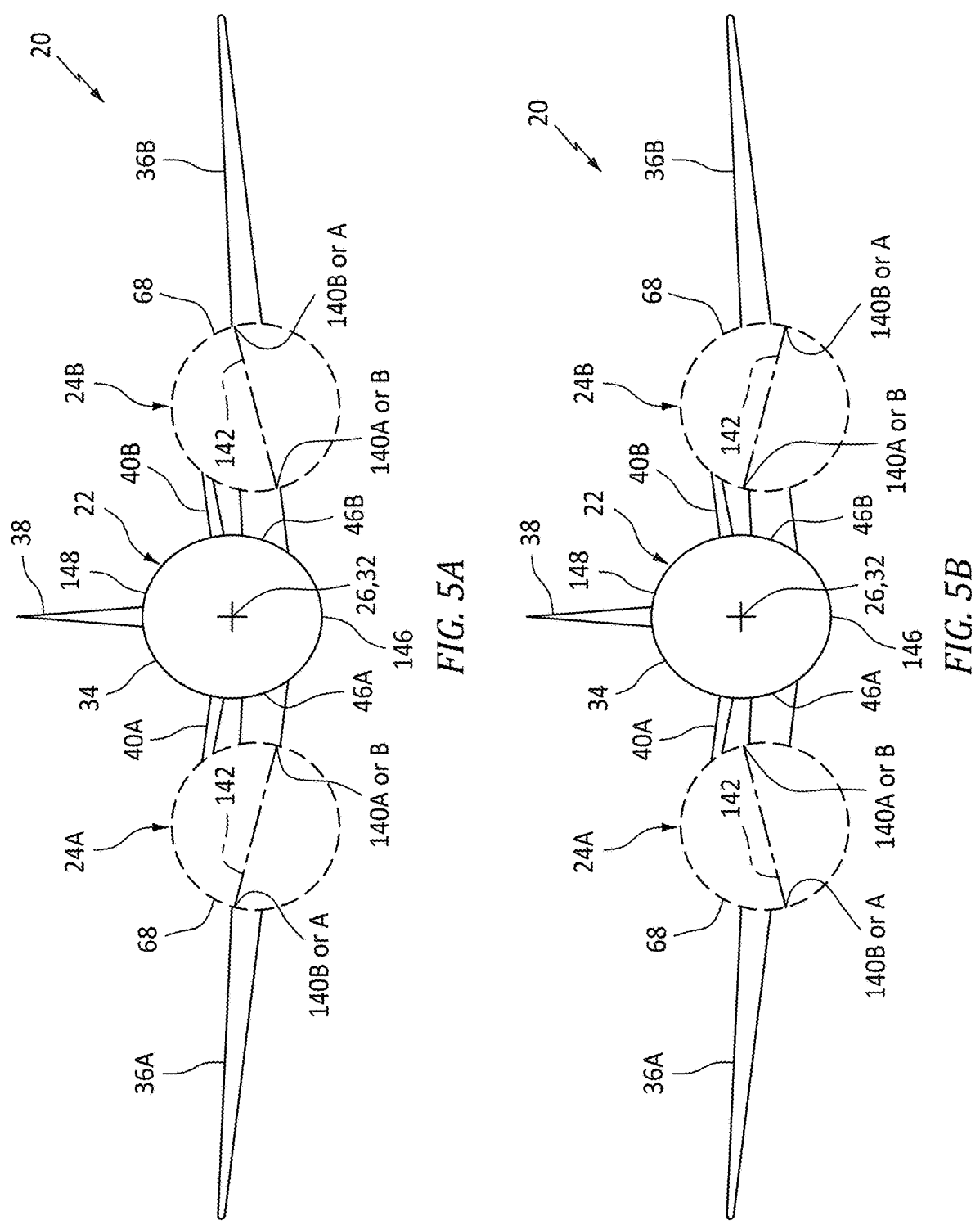
FIGS. 5A and 5B are schematic illustrations of the aircraft with the asymmetric blade pitch schedule of FIG. 4 applied to multiple open propulsor rotors.

In some embodiments, referring to FIGS. 5A and 5B, the blade pitch schedule may be applied such that the propulsor rotors 68 on the opposing lateral sides 46A and 46B of the aircraft fuselage 34 are mirror images of one another. For example, referring to FIG. 5A, the blade pitch max-to-min reference line 142 associated with the blade pitch schedule for each propulsor rotor 68 may be pitched vertically down towards a vertical bottom side 146 of the aircraft airframe 22 and its aircraft fuselage 34. In another example, referring to FIG. 5B, the blade pitch max-to-min reference line 142 associated with the blade pitch schedule for each propulsor rotor 68 may be pitched vertically up towards a vertical top side 148 of the aircraft airframe 22 and its aircraft fuselage 34.

In some embodiments, the first circumferential position 140A may be located laterally closer to the aircraft fuselage 34 (e.g., along the pitch axis 28) than the second circumferential position 140B. In other embodiments, the second circumferential position 140B may be located laterally closer to the aircraft fuselage 34 (e.g., along the pitch axis 28) than the first circumferential position 140A.

Figure 6:
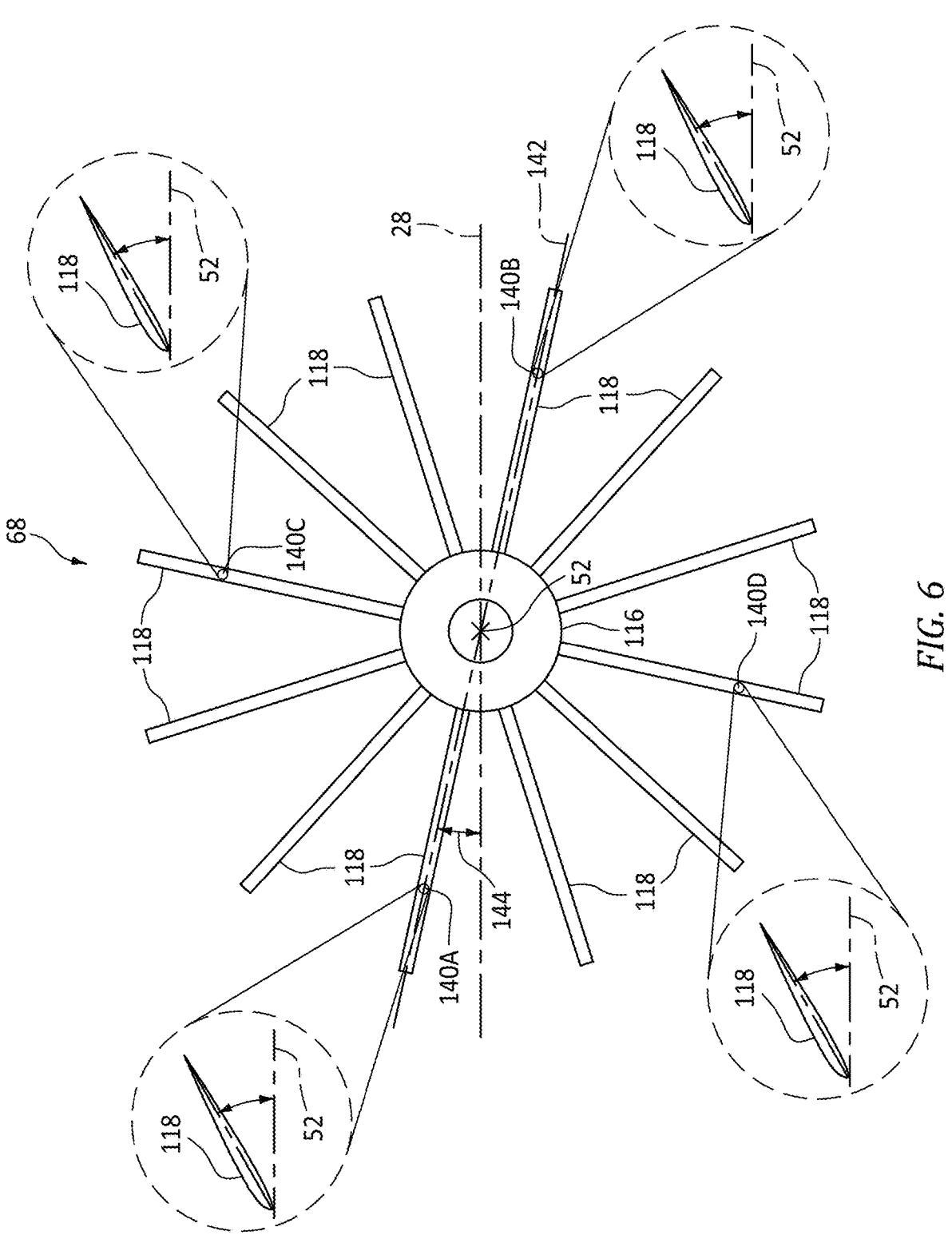
FIG. 6 is a schematic illustration of a symmetric blade pitch schedule applied to the open propulsor rotor.

While the blade pitch schedule of FIG. 4 is an asymmetric blade pitch schedule, the present disclosure is not limited thereto. For example, referring to FIG. 6, the blade actuation system 126 (see FIG. 3) may apply a symmetric blade pitch schedule such that the propulsor blade pitch of each of the propulsor blades 118 has a common (the same) blade pitch value independent of a circumferential position of that propulsor blade 118 about the propulsion system axis 52. For example, with the application of the blade pitch schedule of FIG. 6, the blade pitch value of a respective propulsor blade 118 at the first circumferential position 140A is equal to blade pitch value of a respective propulsor blade 118 at the second circumferential position 140B. The blade pitch value of a respective propulsor blade 118 at the first circumferential position 140A is also equal to the blade pitch value of a respective propulsor blade 118 at each intermediate circumferential position 140C, 140D. The blade pitch value of the propulsor blades 118 in FIG. 6 may be equal to, greater than or less than the maximum blade pitch value of FIG. 4. The blade pitch value of the propulsor blades 118 in FIG. 6 may be equal to, greater than or less than the minimum blade pitch value of FIG. 4. In other words, the blade pitch value of the propulsor blades 118 in FIG. 6 need not (but may be) related to the various blade pitch values of the propulsor blades 118 in FIG. 4.

Figure 7:
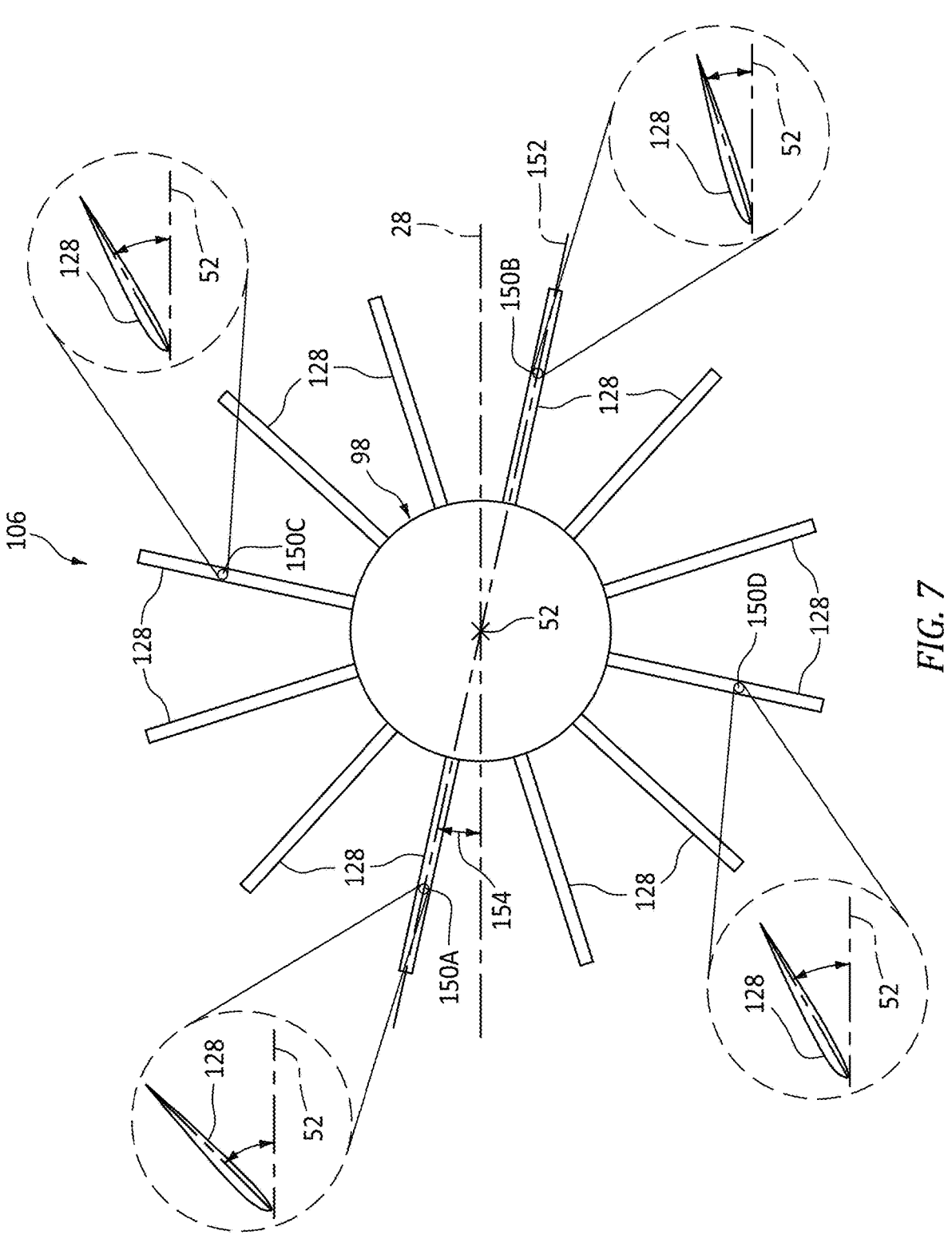
FIG. 7 is a schematic illustration of an asymmetric vane pitch schedule applied to the open guide vane structure.

FIG. 7 schematically illustrates an exemplary tailored vane pitch schedule applied to the guide vanes 128, where inset views are sectional views looking radially inward in a tip-to-base direction where the propulsion system axis 52 is horizontal with the leading edge on a lefthand side. This vane pitch schedule of FIG. 7 is an asymmetric vane pitch schedule. For example, the vane pitch schedule of FIG. 7 is applied by the vane actuation system 138 (see FIG. 3) such that: (a) the guide vane pitch of a respective guide vane 128 located at a third circumferential position 150A about the propulsion system axis 52 has a maximum vane pitch value; and (b) the guide vane pitch of a respective guide vane 128 located at a fourth circumferential position 150B about the propulsion system axis 52 has a minimum vane pitch value. The third circumferential position 150A of FIG. 7 is located diametrically opposite the fourth circumferential position 150B. A (e.g., straight) vane pitch max-to-min reference line 152 extending from the third circumferential position 150A to the fourth circumferential position 150B is thereby coincident with the propulsion system axis 52. With this vane pitch schedule of FIG. 7, the vane actuation system 138 (see FIG. 3) pivots each respective guide vane 128 about its vane pivot axis 136 (see FIG. 3) such that: (a) the guide vane pitches of the respective guide vanes 128 (e.g., uniformly) increase from the minimum vane pitch value to the maximum vane pitch value as the guide vane structure 106 extends circumferentially about the propulsion system axis 52 from the fourth circumferential position 150B through an intermediate position 150D to the third circumferential position 150A; and then (b) the guide vane pitches of the respective guide vanes 128 (e.g., uniformly) decrease from the maximum vane pitch value to the minimum vane pitch value as the guide vane structure 106 extends circumferentially about the propulsion system axis 52 from the third circumferential position 150A through an intermediate position 150C to the fourth circumferential position 150B. Thus, each guide vane 128 located at each intermediate circumferential position 150C, 150D about the propulsion system axis 52 (e.g., midway) between the third circumferential position 150A and the fourth circumferential position 150B has an intermediate vane pitch value between (e.g., half of a difference between) the maximum vane pitch value and the minimum vane pitch value.

The vane pitch schedule of FIG. 7 may be applied concurrently with the blade pitch schedule of FIG. 4. The vane pitch max-to-min reference line 152 may thereby be parallel with or within five degrees (+/−) 5° or ten degrees (+/−) 10° of the blade pitch max-to-min reference line 142 when viewed, for example, in the lateral reference plane. With this arrangement, the vane pitch schedule of FIG. 7 is tailored such that the vane pitch max-to-min reference line 152 is angularly offset from the pitch axis 28 by an offset angle 154 when viewed, for example, in the lateral reference plane. This vane pitch max-to-min reference line offset angle 154 may be between zero degrees) (0° and forty-five degrees) (45° inclusive. Within the foregoing range, the vane pitch max-to-min reference line offset angle 154 may be equal to or greater than ten degrees) (10° and/or equal to or less than twenty-five degrees) (25°. For example, the vane pitch max-to-min reference line offset angle 154 may be between fifteen degrees) (15° and twenty degrees) (20° inclusive in some select embodiments. Here, the vane pitch max-to-min reference line offset angle 154 of FIG. 7 may be equal to or within five degrees (+/−) 5° or ten degrees (+/−) 10° of the blade pitch max-to-min reference line offset angle 144 of FIG. 4. The present disclosure, however, is not limited to such an exemplary vane pitch schedule. For example, it is contemplated the vane pitch schedule of FIG. 7 may be rotated (e.g., +/−30°, +/−45°, +/−60°, +/−90° or anywhere in-between) about the respective propulsion system axis 52 to reduce effects of other types of loading and/or to provide thrust vectoring from the propulsor rotor 68.

In some embodiments, a difference between the maximum blade pitch value and the minimum blade pitch value for the blade pitch schedule of FIG. 4 may be equal to a difference between the maximum vane pitch value and the minimum vane pitch value for the vane pitch schedule of FIG. 7. In other embodiments, the difference between the maximum blade pitch value and the minimum blade pitch value for the blade pitch schedule of FIG. 4 may be different (e.g., larger) than the difference between the maximum vane pitch value and the minimum vane pitch value for the vane pitch schedule of FIG. 7. For example, the difference between the maximum blade pitch value and the minimum blade pitch value for the blade pitch schedule of FIG. 4 may be equal to or greater than 1.1×, 1.5×, 2× larger than the difference between the maximum vane pitch value and the minimum vane pitch value for the vane pitch schedule of FIG. 7.

Figure 8:
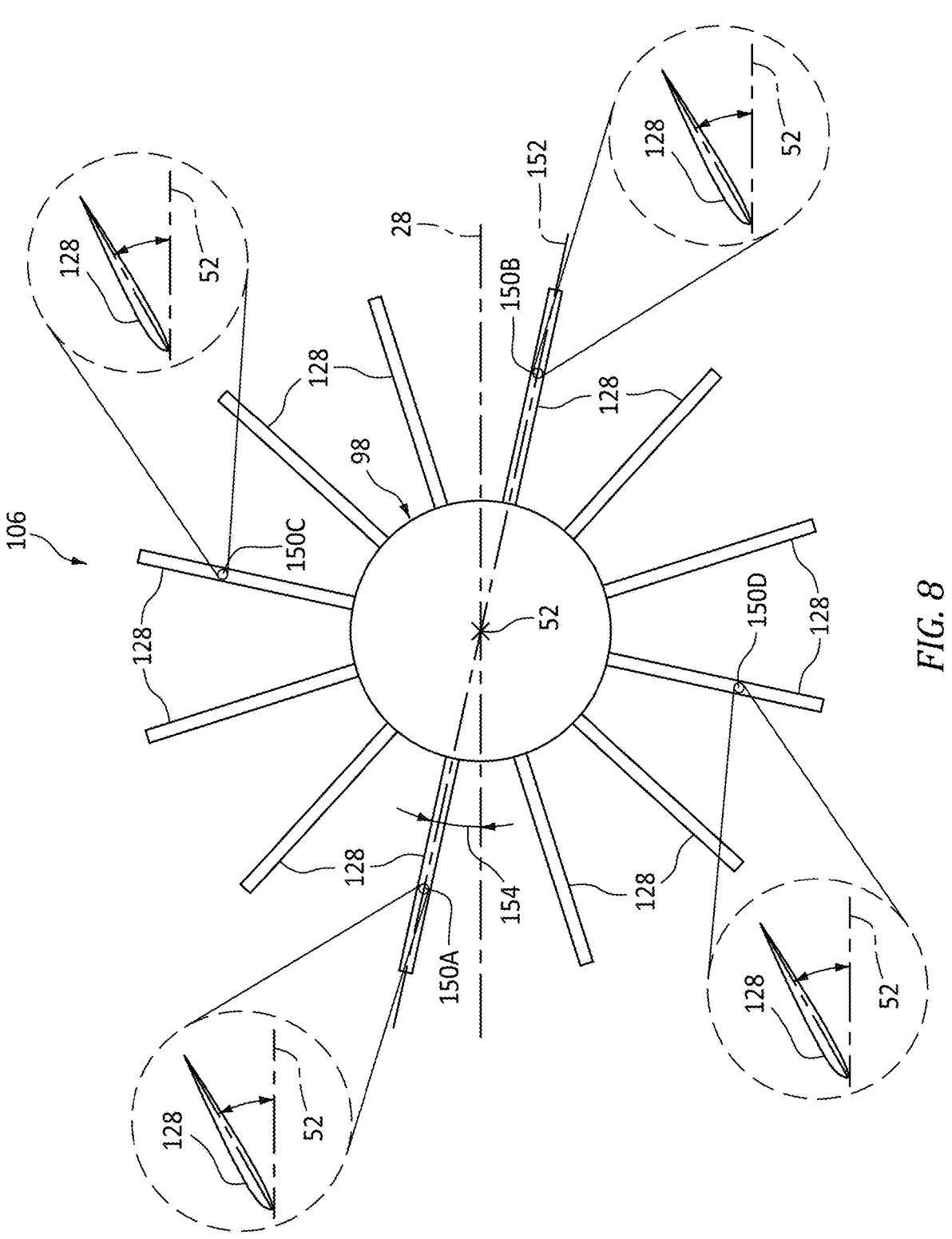
FIG. 8 is a schematic illustration of a symmetric vane pitch schedule applied to the open guide vane structure.

While the vane pitch schedule of FIG. 7 is an asymmetric vane pitch schedule, the present disclosure is not limited thereto. For example, referring to FIG. 8, the vane actuation system 138 (see FIG. 3) may apply a symmetric vane pitch schedule such that the guide vane pitch of each of the guide vanes 128 has a common (the same) vane pitch value independent of a circumferential position of the guide vanes 128 about the propulsion system axis 52. For example, with the application of the vane pitch schedule of FIG. 8, the vane pitch value of a respective guide vane 128 at the third circumferential position 150A is equal to vane pitch value of a respective guide vane 128 at the fourth circumferential position 150B. The vane pitch value of a respective guide vane 128 at the third circumferential position 150A is also equal to the guide vane value of a respective guide vane 128 at each intermediate circumferential position 150C, 150D. The guide vane value of the guide vanes 128 in FIG. 8 may be equal to, greater than or less than the maximum guide vane value of FIG. 7. The guide vane value of the guide vanes 128 in FIG. 8 may be equal to, greater than or less than the minimum guide vane value of FIG. 7. In other words, the vane pitch value of the guide vanes 128 in FIG. 8 need not (but may be) related to the various vane pitch values of the guide vanes 128 in FIG. 7.

Referring to FIG. 3, each aircraft propulsion system 24 also includes a controller 156 in signal communication with (e.g., hardwired and/or wirelessly coupled to) the blade actuation system 126 and/or the vane actuation system 138. This controller 156 is configured to control operation of the blade actuation system 126 and/or the vane actuation system 138 in order to facilitate, for example, the application of the blade pitch schedule of FIG. 4 simultaneously with the application of the vane pitch schedule of FIG. 7. The controller 156, for example, may signal the blade actuation system 126 to apply the blade pitch schedule of FIG. 4 (or another schedule) while also signaling the vane actuation system 138 to apply the vane pitch schedule of FIG. 7 (or another schedule).

The controller 156 may be configured as an onboard engine controller; e.g., an electronic engine controller (EEC), an electronic control unit (ECU), a full-authority digital engine controller (FADEC), etc. The controller 156 may be implemented with a combination of hardware and software. The hardware may include memory 158 and at least one processing device 160, which processing device 160 may include one or more single-core and/or multi-core processors. The hardware may also or alternatively include analog and/or digital circuitry other than that described above.

The memory 158 is configured to store software (e.g., program instructions) for execution by the processing device 160, which software execution may control and/or facilitate performance of one or more operations such as those described herein. The memory 158 may be a non-transitory computer readable medium. For example, the memory 158 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 9:
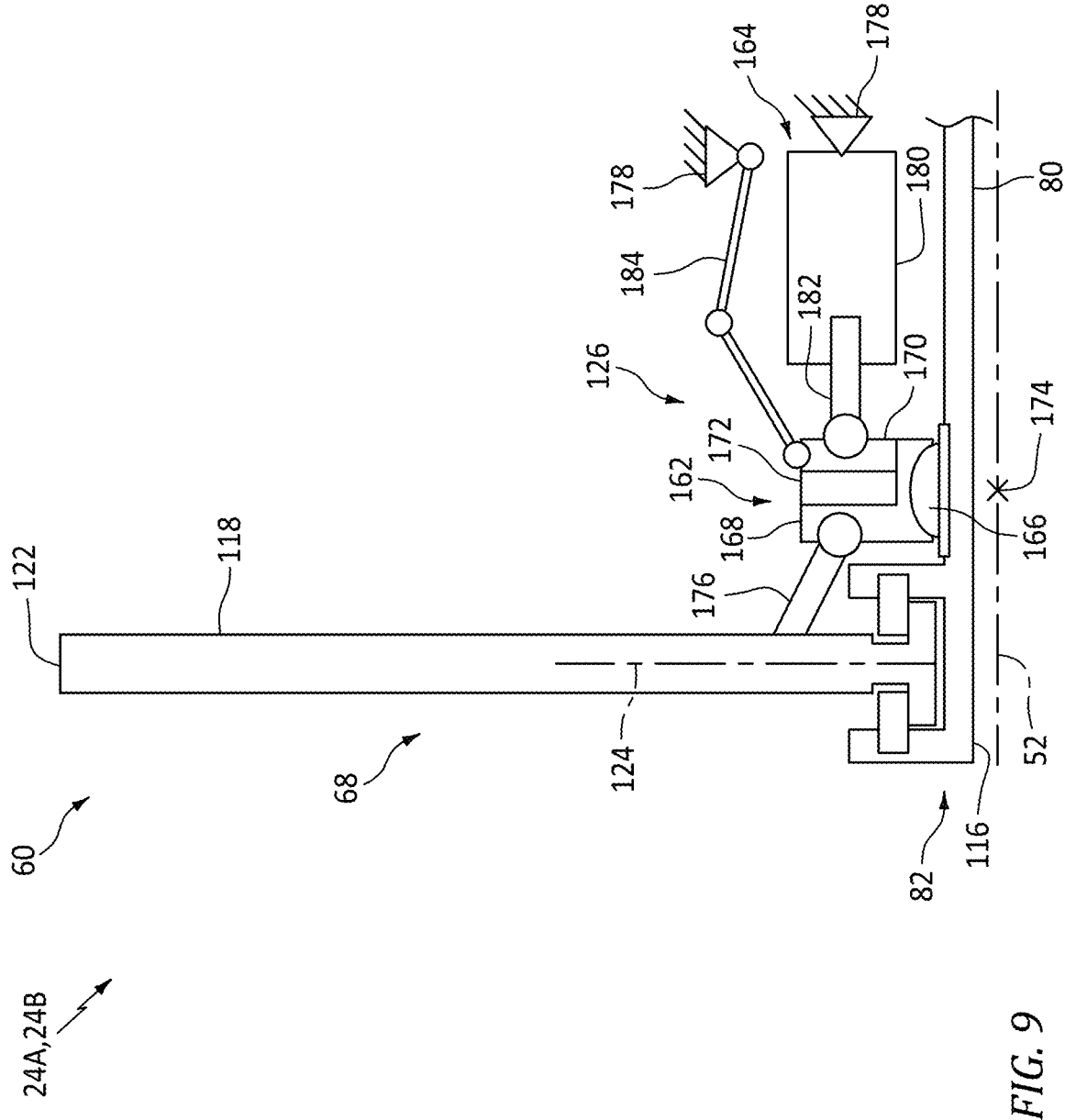
FIG. 9 is a partial schematic illustration of the open propulsor rotor with a blade actuation system.
Figure 10:
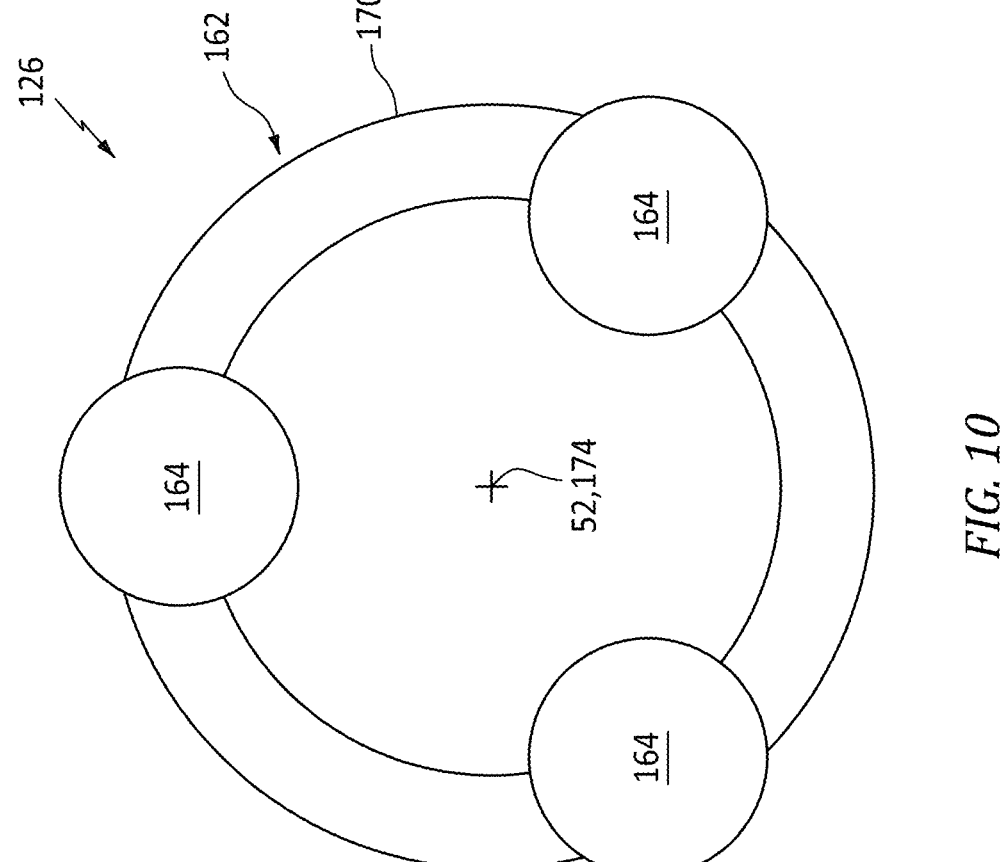
FIG. 10 is a schematic end view illustration of the blade actuation system.

In some embodiments, referring to FIG. 9, the blade actuation system 126 may include a swashplate 162 and one or more actuators 164 (see also FIG. 10). The swashplate 162 of FIG. 9 includes a spherical bearing 166, a rotating ring 168, a non-rotating ring 170 and an intermediate bearing 172. The spherical bearing 166 is mounted to the propulsor rotating structure 82 and, more particularly, to the propulsor shaft 80. The spherical bearing 166 of FIG. 9 is configured to axially translate along the propulsor rotating structure 82 and its propulsor shaft 80. However, in other embodiments, it is contemplated the spherical bearing 166 may alternatively be fixedly mounted to the propulsor rotating structure 82 and its propulsor shaft 80. The rotating ring 168 is mounted to the spherical bearing 166. This rotating ring 168 of FIG. 9 is configured to pivot about a center point 174 of the spherical bearing 166. Both the spherical bearing 166 and the rotating ring 168 of FIG. 9 are rotatably fixed with the propulsor rotating structure 82 and its propulsor shaft 80. Thus, both the spherical bearing 166 and the rotating ring 168 are rotatable with the propulsor rotating structure 82 and its propulsor shaft 80. By contrast, the non-rotating ring 170 is rotationally fixed about the propulsion system axis 52. This non-rotating ring 170 of FIG. 9 engages the rotating ring 168 through the intermediate bearing 172. Examples of the intermediate bearing 172 include, but are not limited to, an axial plain bearing and an axial rolling element bearing.

The rotating ring 168 is coupled to each propulsor blade 118 through a respective linkage 176; e.g., a bell crank. The non-rotating ring 170 is coupled to a stationary structure 178 of the respective aircraft propulsion system 24 through the actuators 164. A base 180 of each actuator 164, for example, is mounted to the stationary structure 178. A moving element 182 of each actuator 164 is coupled (e.g., pinned, hinged, etc.) to the non-rotating ring 170. Referring to FIG. 10, the actuators 164 are arranged and may be equispaced circumferentially about the propulsion system axis 52. Here, the blade actuation system 126 includes three (3) of the actuators 164 to provide three-dimensional (3D) swashplate actuation. The present disclosure, however, is not limited to such an exemplary number of the actuators 164. For example, the blade actuation system 126 may alternatively include two (2) of the actuators 164 to provide two-dimensional (2D) swashplate actuation. Referring again to FIG. 9, examples of the actuators 164 include, but are not limited to, electric motors, hydraulic actuators (e.g., hydraulic pistons) and pneumatic motors. Note, an additional control linkage 184 may also extend between and be coupled to the non-rotating ring 170 and the stationary structure 178 to reduce or remove torque from the intermediate bearing 172.

Figure 11:
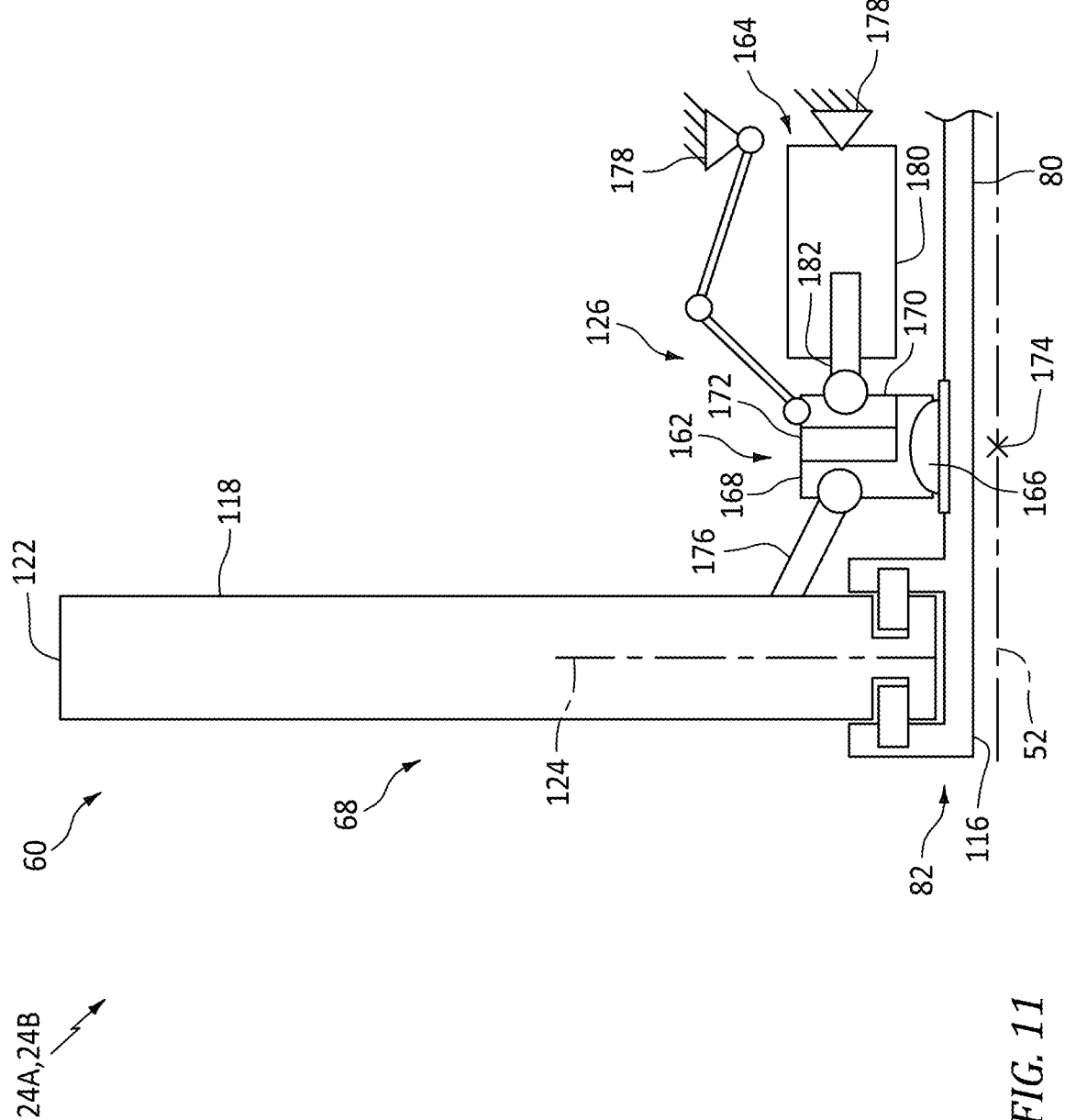
FIG. 11 is a partial schematic illustration of the open propulsor rotor with the blade actuation system in another arrangement.
Figure 12:
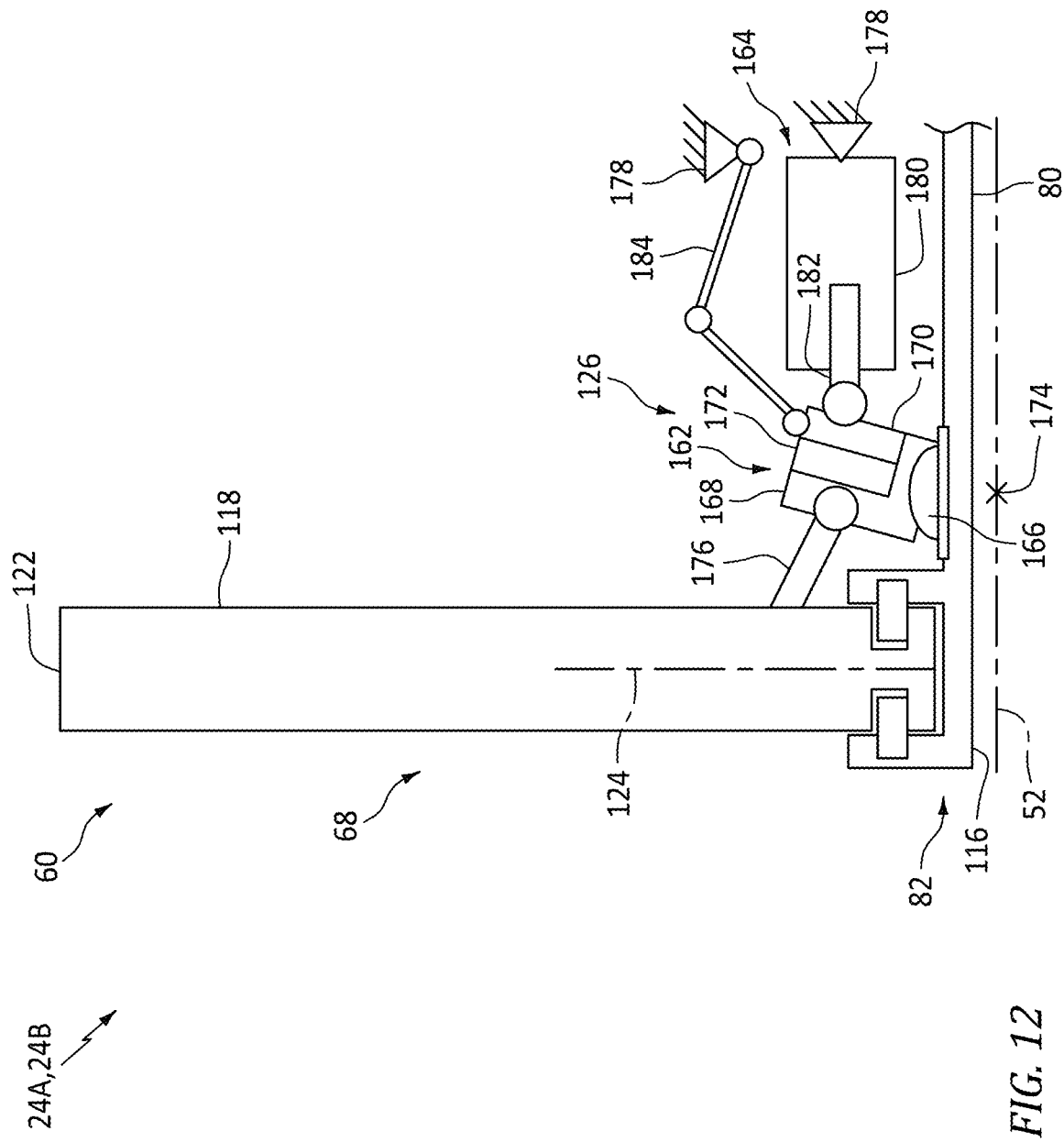
FIG. 12 is a partial schematic illustration of the open propulsor rotor with the blade actuation system in still another arrangement.

During blade actuation system operation, all of the actuators 164 may be operated (e.g., signaled by the controller 156 of FIG. 3) to axially translate the swashplate 162 along the propulsion system axis 52 from a first position (e.g., see FIG. 9) to a second position (e.g., see FIG. 11). By axially translating the swashplate 162 along the propulsion system axis 52 (e.g., without pivoting the swashplate 162 about its center point 174), the blade actuation system 126 may uniformly change the propulsor blade pitch of all of the propulsor blades 118. By contrast, the actuators 164 may be operated (e.g., signaled by the controller 156 of FIG. 3) to pivot the swashplate 162 about its center point 174 from a first arrangement (e.g., see FIG. 9) to a second arrangement (e.g., see FIG. 12). By pivoting the swashplate 162 about its center point 174 (e.g., without translating the swashplate 162 along the propulsion system axis 52), the blade actuation system 126 may asymmetrically change the propulsor blade pitch of the propulsor blades 118 (e.g., according to the blade pitch schedule of FIG. 4). Of course, it is also contemplated the actuators 164 may be operated (e.g., signaled by the controller 156 of FIG. 3) to both (a) axially translate the swashplate 162 along the propulsion system axis 52 and (b) pivot the swashplate 162 about its center point 174.

Figure 13:
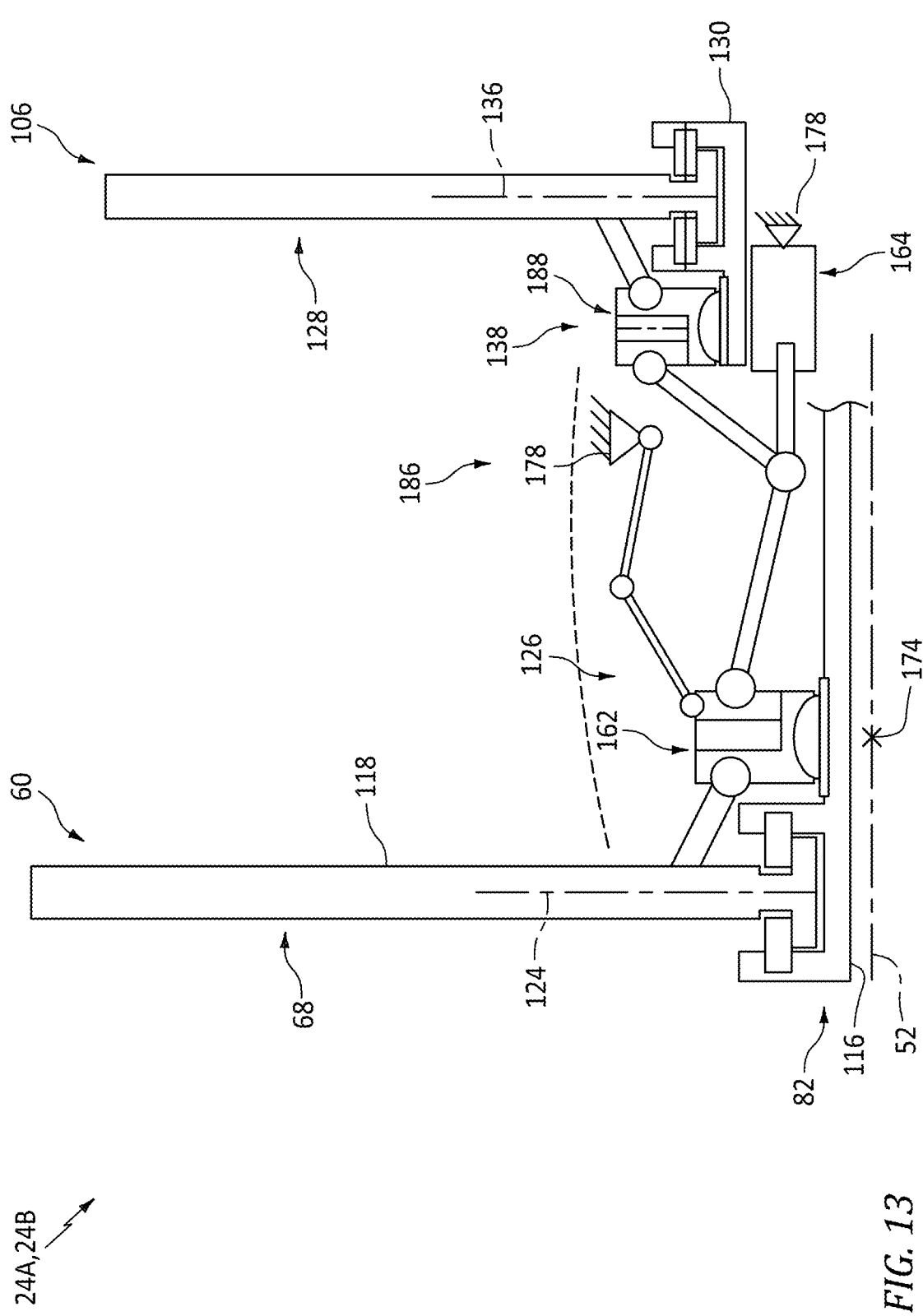
FIG. 13 is a partial schematic illustration of the open propulsor rotor and the open guide vane structure with a common pitch actuation system.

In some embodiments, referring to FIG. 3, the blade actuation system 126 and the vane actuation system 138 may be configured as discrete systems. In other embodiments, referring to FIG. 13, the blade actuation system 126 and the vane actuation system 138 may be integrated into a single pitch actuation system 186. The vane actuation system 138 of FIG. 13, for example, includes another swashplate 188 (or a synch-ring) coupling the actuators 164 to the guide vanes 128. With this arrangement, a single set of the actuators 164 are mechanically coupled to both the propulsor blades 118 and the guide vanes 128. Moreover, this single set of the actuators 164 may concurrently actuate both the (symmetric or asymmetric) pivoting of the propulsor blades 118 as well as the (symmetric or asymmetric) pivoting of the guide vanes 128. Of course, a cam or other device may also be included such that a magnitude of the pivoting of the propulsor blades 118 is different (e.g., greater) than a magnitude of the pivoting of the guide vanes 128.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating a propulsion system of an aircraft, comprising:

driving rotation of a propulsor rotor of the propulsion system about a rotational axis, the propulsor rotor comprising a plurality of rotor blades arranged circumferentially around the rotational axis; and applying a first blade pitch schedule to the propulsor rotor while the propulsor rotor is rotating about the rotational axis such that a pitch of each of the plurality of rotor blades has a maximum blade pitch value when located at a first circumferential position about the rotational axis;

the pitch of each of the plurality of rotor blades has a minimum blade pitch value when located at a second circumferential position about the rotational axis; and a reference line extending between the first circumferential position and the second circumferential position is angularly offset from a pitch axis of the aircraft by a first offset angle between zero degrees and forty-five degrees.

2. The method of claim 1, wherein the second circumferential position is arranged diametrically opposite the first circumferential position.

3. The method of claim 1, wherein the first offset angle is equal to or greater than ten degrees.

4. The method of claim 1, wherein the first offset angle is equal to or less than twenty-five degrees.

5. The method of claim 1, wherein the propulsion system is disposed to a lateral side of a fuselage of the aircraft; and the reference line is pitched down towards a bottom side of the fuselage.

6. The method of claim 1, wherein the propulsion system is disposed to a lateral side of a fuselage of the aircraft; and the reference line is pitched up towards a top side of the fuselage.

7. The method of claim 1, wherein the propulsion system is disposed to a lateral side of a fuselage of the aircraft; and the first circumferential position is located closer to the fuselage than the second circumferential position.

8. The method of claim 1, wherein the propulsion system is disposed to a lateral side of a fuselage of the aircraft; and the second circumferential position is located closer to the fuselage than the first circumferential position.

9. The method of claim 1, further comprising applying a second blade pitch schedule to the propulsor rotor while the propulsor rotor is rotating about the rotational axis such that the pitch of each of the plurality of rotor blades has a first blade pitch value when located at the first circumferential position about the rotational axis;

the pitch of each of the plurality of rotor blades has a second blade pitch value when located at the second circumferential position about the rotational axis; and the second blade pitch value is equal to the first blade pitch value.

10. The method of claim 1, further comprising applying a second blade pitch schedule to the propulsor rotor while the propulsor rotor is rotating about the rotational axis such that the pitch of each of the plurality of rotor blades has a common blade pitch value independent of a circumferential position about the rotational axis.

11. The method of claim 1, wherein the propulsion system includes a swashplate and a plurality of actuators coupled to the swashplate; and the first blade pitch schedule is applied to the propulsor rotor using the plurality of actuators through the swashplate.

12. The method of claim 1, wherein the propulsion system is an open rotor propulsion system, and the propulsor rotor is an open propulsor rotor.

13. The method of claim 1, wherein the propulsion system includes a stator vane structure next to and downstream of the propulsor rotor, the stator vane structure includes a plurality of stator vanes arranged circumferentially around the rotational axis, and the method further comprises applying a first vane pitch schedule to the stator vane structure concurrently with the applying of the first blade pitch schedule to the propulsor rotor such that a pitch of one of the plurality of stator vanes located at a third circumferential position about the rotational axis has a maximum vane pitch value;

the pitch of another one of the plurality of stator vanes located at a fourth circumferential position about the rotational axis has a minimum vane pitch value; and a second reference line extending between the third circumferential position and the fourth circumferential position is angularly offset from the pitch axis of the aircraft by a second offset angle between zero degrees and forty-five degrees.

14. The method of claim 13, wherein the second offset angle is equal to or within five degrees of the first offset angle.

15. The method of claim 13, wherein the propulsion system includes an actuator used to perform the applying of the first blade pitch schedule and the applying of the first vane pitch schedule.

16. The method of claim 13, wherein a difference between the maximum blade pitch value and the minimum blade pitch value according to the first blade pitch schedule is equal to a difference between the maximum vane pitch value and the minimum vane pitch value according to the first vane pitch schedule.

17. The method of claim 13, wherein a difference between the maximum blade pitch value and the minimum blade pitch value according to the first blade pitch schedule is greater than a difference between the maximum vane pitch value and the minimum vane pitch value according to the first vane pitch schedule.

* * * * *